United States Patent [19]

Bradley

[11] Patent Number: 5,076,661
[45] Date of Patent: Dec. 31, 1991

[54] REAR PROJECTION SCREEN

[75] Inventor: Ralph H. Bradley, Kingsport, Tenn.

[73] Assignee: North American Philips Corp., New York, N.Y.

[21] Appl. No.: 644,723

[22] Filed: Jan. 23, 1991

[51] Int. Cl.⁵ .................................. G03B 21/60
[52] U.S. Cl. ....................................... 359/456
[58] Field of Search ..................... 350/128; 358/60

[56] References Cited

U.S. PATENT DOCUMENTS

| | | | |
|---|---|---|---|
| 2,618,198 | 11/1952 | Luboshez | 350/128 |
| 3,809,457 | 5/1974 | Kurtz et al. | 350/128 |
| 3,830,556 | 8/1974 | Bratkowski | 350/128 |
| 4,573,764 | 3/1986 | Bradley | 350/128 |

Primary Examiner—Richard A. Wintercorn
Attorney, Agent, or Firm—John C. Fox

[57] ABSTRACT

A rear projection screen for color television of the type having an array of vertically oriented, parallel lenticular elements on the front surface, uses two diagonally crossed, parallel lenticular element arrays embedded in the screen to control spreading of light into the front lenticular array, achieving better control and less attenuation of the light than systems using surface of bulk diffusion or a single horizontal lenticular array.

9 Claims, 2 Drawing Sheets

REAR PROJECTION SCREEN

BACKGROUND OF THE INVENTION

This invention relates to rear projection screens, and more particularly relates to such screens having a vertically oriented, parallel array of steep-sided lenticular elements on the front surface, for spreading light horizontally into the audience space.

Such a screen is known from my U.S. Pat. No. 4,573,764, in which a remarkably wide horizontal angle of view of greater than plus or minus 85 degrees relative to the projection axis is accomplished by combining a conventional light collimating circular Fresnel lens with a light distributing lenticular lens array in which the individual lenticular elements have critical design parameters including height-to-width ratio and overall width-to-tip width ratio, as well as tip regions characterized by two lateral convex and central concave cylindrical elements, resulting in exceptional horizontal dispersion of light, while at the same time exhibiting minimal color shift.

The design of the lenticular elements results in steep sides on which some light is reflected by the phenomenon known as total internal reflection (TIR). This tends to concentrate the light in the tip region of the lenticular elements before it passes into the audience space. For this reason, the front lenticular lens array is referred to herein as the TIR array.

Dispersion of the light rays in the vertical direction is generally accomplished by diffusion means located between the light collimating Fresnel lens and the light spreading lenticular lens array.

In the case of projection television, it is usually not necessary to distribute the light through a large vertical included angle, since the individual vertical viewing angles within the audience typically vary only a few degrees from one another. On the other hand, for optimal performance of the TIR array, it is advantageous to spread the light horizontally before it reaches the TIR array. Unfortunately, the amount of diffusion needed to achieve adequate horizontal spreading can significantly reduce screen gain. Furthermore, the spreading of light due to diffusion is not optimal for the performance of the TIR array with diffusion, some rays are deviated through too great an angle to usefully illuminate the TIR array, so loss performance, e.g., increased color shift, can occur. A vertical lenticular array with a small pitch placed behind the TIR array can be used to effect the desired horizontal spreading of the light, but can result in objectionable moire.

The use of crossed lenticular arrays to control spreading of light in two different directions is known from U.S. Pat. Nos. 2,618,198 and 3,830,556. However, these arrays were the only means used to control the light entering the screen and the audience space. If such arrays were combined with other optical elements or surfaces such as a circular Fresnel lens and/or a TIR array, (see, for example, U.S. Pat. No. 4,432,010) screen gain would be compromised due to transmission and/or reflection losses, the exact nature of which would be determined by the particular screen structure and materials chosen.

OBJECTS AND SUMMARY OF THE INVENTION

Accordingly, it is an object of the invention to provide a rear projection screen employing a front TIR array in which vertical spreading of the light is achieved by means other than diffusion or a horizontally oriented lenticular array.

It is another object of the invention to provide means for spreading the light in the vertical direction which also spreads light in the horizontal direction.

It is another object of the invention to provide such spreading means which can control the relative amounts of spreading in the vertical and horizontal directions.

It is another object of the invention to provide such spreading means without appreciably compromising screen gain through transmission and/or reflection losses.

It is another object of the invention to provide such spreading means without introducing objectionable moire.

According to the invention, a rear projection screen employing a front TIR array is characterized in that the screen includes two lenticular arrays, diagonally crossed at an angle with respect to the vertical to result in a desired amount of spreading of the light in the vertical and horizontal directions, at least one of the lenticular arrays being imbedded in the screen.

According to a preferred embodiment of the invention, both lenticular arrays are imbedded in the screen.

According to another preferred embodiment, a circular Fresnel lens is located on the rear surface of the screen.

In another permissible variation, the screen is in two pieces, the TIR array is on the front of the first piece, at least one of the lenticular arrays is imbedded in either the first or second piece, and the circular Fresnel lens is located on the front of the second piece.

As used herein, the term "imbedded" means that the optical surface is defined by the boundary surface between two solid optical media having different indices of refraction. In contrast, having a lens element or array on a screen surface means that the lens element or array is defined by a screen-air interface. A "two-piece" screen is one having four such interfaces.

An advantage of the invention is that the diagonally crossed lenticular arrays partially or completely eliminate the need for bulk or surface diffusion means. Another advantage of the invention is that because the arrays are imbedded in the sheet of optical medium which includes the TIR array, reflection losses which would otherwise occur at the array surface-air interface are essentially eliminated.

Through the use of different refractive indices for the adjacent layers within this sheet, sufficient optical power can be present for the imbedded lenticular arrays to cause the desired horizontal and vertical spreading of the projected light prior to the interaction of that light with the main vertical lenticular array. Therefore these ancillary arrays function as substitutes for the diffusion. However, because there is great latitude in the design of the imbedded lenticular arrays and especially because the strength of the spreading introduced is not necessarily the same in the vertical and the horizontal directions, it is possible to achieve a more optimum screen design for some applications.

It is preferred that the imbedded lenticular arrays be formed by a process making use of a photo-polymerization replication process in which ultraviolet light is used to promote the rapid curing of plastic/monomer syrups or other suitable curable liquid systems. But any process for the successive formation of optically shaped layers through the use of prepared tools, e.g. molds, could be used. The adaptation of any of these techniques for the use of a continuous process is also possible.

Control of moire will be achieved by controlling the angle at which the imbedded arrays cross the vertical direction.

The imbedded lenticulars may be of any convenient shape: convex, concave, concave/convex, and they may have individual lenses which are circular in cross section or of more complex cross sections. For example the cross section could vary as $\sin(x)$ or $\sin^2(x)$ or in another form which produces the desired spreading and distribution of light.

Some diffusion may be used in conjunction with the ancillary lenticular arrays to smooth the distribution of light, especially in the vertical fringes of the intended audience field and to help to mask minor defects and also to reduce moire caused by the fresnel with respect to the TIR array.

DESCRIPTION OF THE PREFERRED EMBODIMENTS

A color television projection system employing a wide angle viewing screen of the invention will now be briefly described. The screen can, of course, be used with other projection systems, such as the color television projection system employing liquid crystal displays, described in U.S. Pat. No. 4,864,390.

Figure 1:
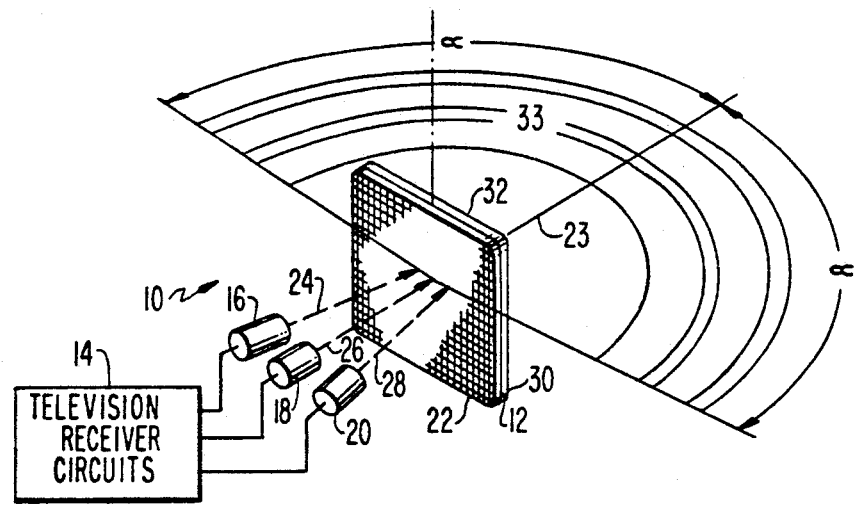
FIG. 1 is a perspective view of a rear projection color television system employing a preferred embodiment of a rear projection screen of the invention.

FIG. 1 illustrates a rear projection color television system 10 employing a rear projection screen 12. Video signals are received by television receiver circuits 14 and are projected through individual red, green and blue cathode ray tube (CRT)/lens projector assemblies 16, 18, and 20, onto the rear surface 22 of projection screen 12. The three CRT/lens projector assemblies 16, 18 and 20 each include a CRT and associated projection optics, and are arranged horizontally with respect to screen 12. The green assembly 18 is located so as to have its optical axis 26 coincide with the central projection axis, while the red and blue assemblies 16 and 20, having optical axes 24 and 28 respectively, are laterally and angularly offset from the green axis 26.

The front section 30 of screen 12 includes an array of closely-spaced vertically oriented and mutually parallel lenticular lens elements or lenticules 32, shaped to spread light horizontally through a wide viewing angle $\alpha$ in audience field 33.

Figure 2:
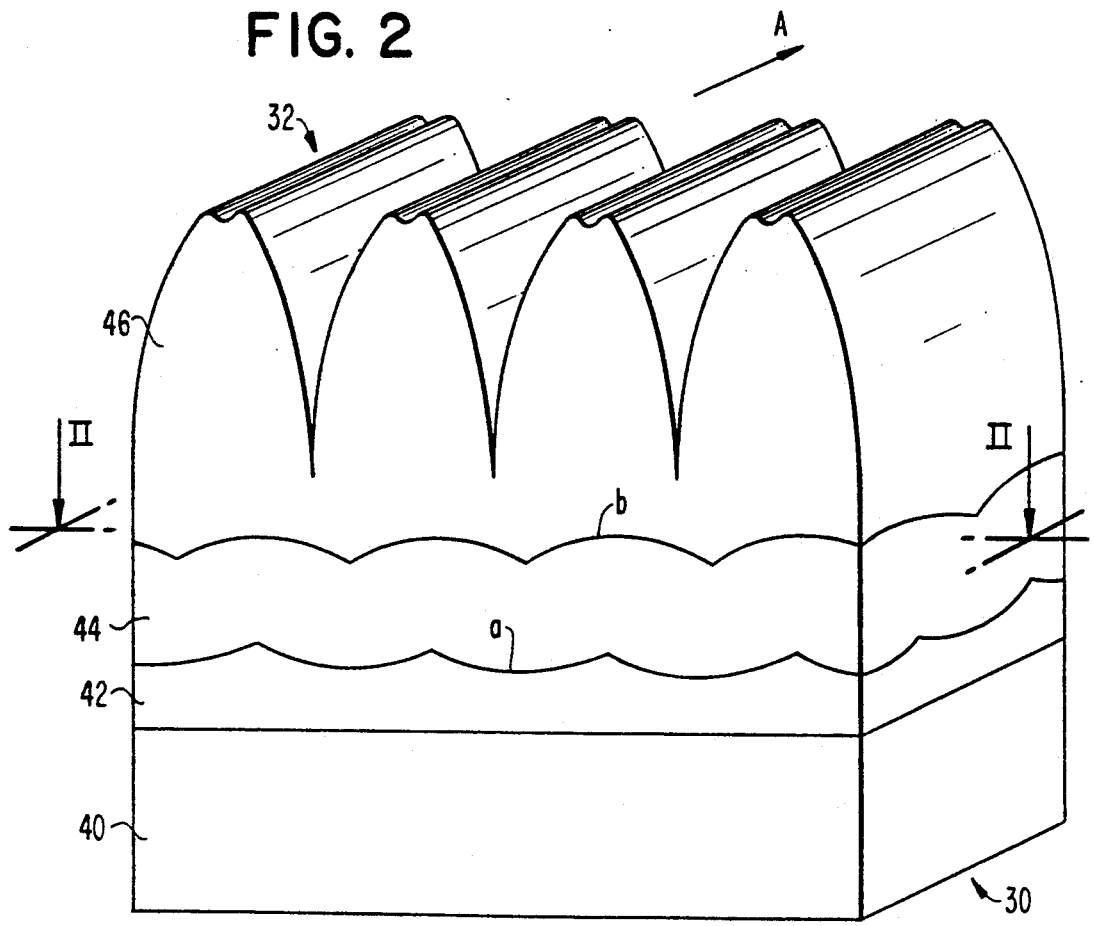
FIG. 2 is a perspective view of a corner section of the screen of FIG. 1, showing imbedded crossed lenticular arrays in accordance with the invention.

FIG. 2, a corner section of the front section 30 of screen 12, in which arrow A indicates the vertical direction, shows embedded lenticular arrays a and b, formed on a substrate of optical medium 40, by applying layers 42, 44 and 46 of optical media, at least the adjacent layers having different indices of refraction, so that the contoured interfaces between these layers form lens arrays.

Figure 3:
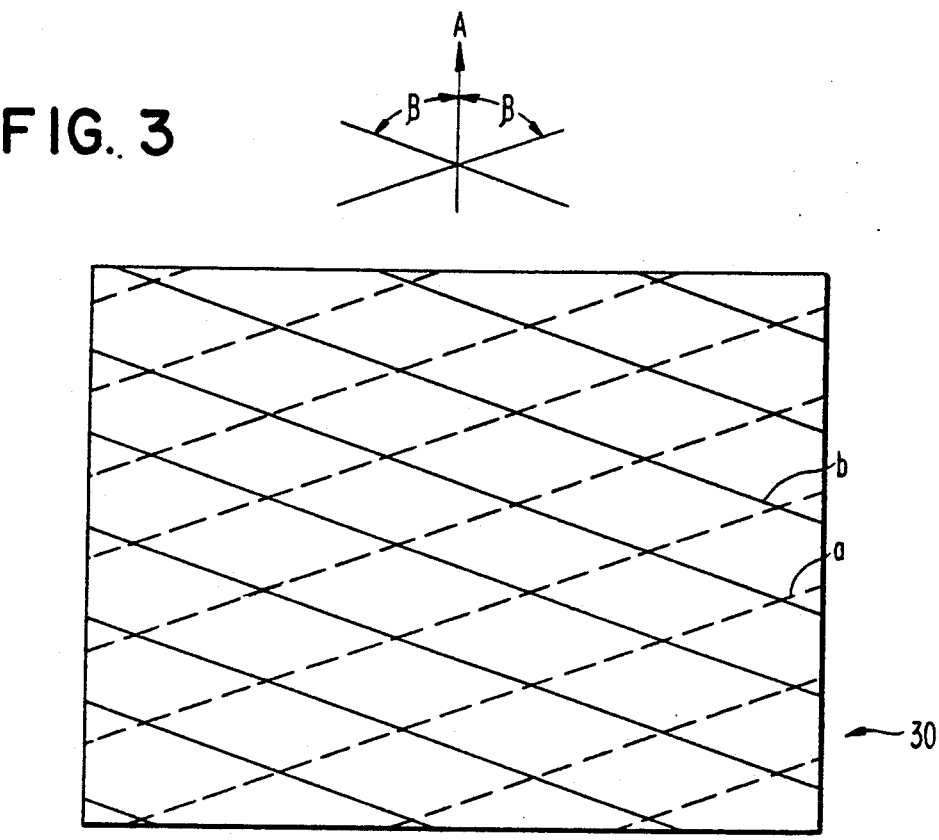
FIG. 3 is a plan view of the crossed lenticular array of FIG. 2, along section line II.

FIG. 3, a plan view taken along section II—II of FIG. 2, shows the crossed lenticular arrays a and b each forming an angle beta with the vertical direction, indicated by arrow A.

A function in the form $\sin^2(x)$ could be achieved by making use of tooling produced by photoetching using fringes produced by the interference of coherent plane light waves. A more conventional approach to produce a master tool would be to cut a repeating pattern of cylindrical grooves with a diamond tool having a rounded tip. An electroform process would permit replicas of the master tool to be produced.

To avoid unnecessary loss of resolution, the pitch of the crossed lenticular arrays should be about the pitch of the main vertical lenticular array present on the external surface of the screen sheet or smaller. Also the thickness of the portion of the screen inclusive of diffusion (if any), the crossed ancillary lenticular arrays and the main vertical lenticular array should be sufficiently thin that spreading of light passing through these arrays does not produce unacceptable loss of resolution.

Ordinarily each of the crossed ancillary lenticular arrays should be designed to produce approximately equivalent spreading of a normally incident plane light wave and each of these lenticular arrays should make an angle of about the same magnitude but opposite sign with respect to the vertical. In this way the symmetry in the horizontal distribution of light by the screen is maintained. The relative power of the combined effect of the crossed, imbedded arrays to spread light in the horizontal direction vs. the vertical direction can be adjusted by varying the angle at which the imbedded arrays cross the vertical direction. In FIG. 3, as long as the crossing angle $\beta$ is between 30 degrees and 60 degrees, moire will be controlled.

In FIG. 2, the layers of optically transmissive media a, b and c have refractive index n1, n2, and n3 respectively. To achieve sufficient optical power in the imbedded lenticular arrays there must be a sufficient difference in refractive index between adjacent layers. For example, n1 and n3 may be equal with n2 larger or smaller. The substrate layer serves no optical purpose in the design illustrated. Also, there could be an additional medium layer introduced between the main lenticular array and layer B if desired. If diffusion is also desired, it would preferably be bulk diffusion and could be in one or more layers of the media including the substrate layer.

The effect of the imbedded lenticulars can be readily predicted from basic optical laws. The power of the imbedded lenticulars will vary as the refractive index difference of the respective adjacent media. Snell's law may be used with ray tracing to determine in detail the performance of the lenticular in the context of the screen design. The Fresnel reflection coefficient equations will readily show that undesired reflections of either projected or ambient light by the imbedded layers, which would have a refractive difference of say 0.2, will be low and therefore the presence of the imbedded layers will not significantly impair the optical performance of the screen. Such unwanted reflections, and associated loss of screen efficiency and contrast are the principal reasons why just adding an additional sheet to a screen is not preferred. Another disadvantage of adding sheets is that the mechanical stability, e.g. warp/bow, becomes a problem.

Figure 4:
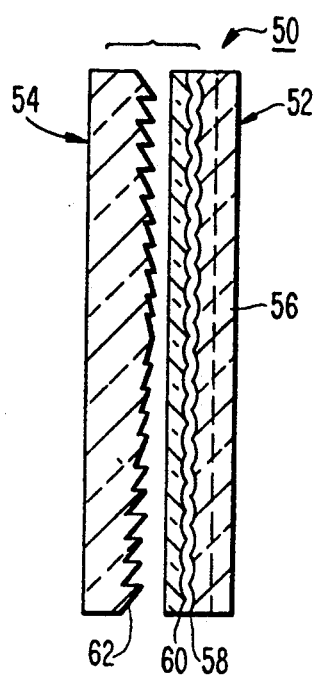
FIG. 4 is a section view of a two-piece screen in accordance with the invention.

Ordinarily there will be a Fresnel lens either on the back surface of the screen sheet described above or on a surface of a second sheet placed behind the front sheet such that two sheets (four surfaces) comprise the total screen in accordance with the screen art so the present conception allows the design of either a one piece screen or a two piece screen as desired. Such a screen 50 is shown in FIG. 4, having a front piece 52 and a rear piece 54, the front surface of the front piece 52 having a TIR array 56, and imbedded, diagonally crossed lenticular arrays 58 and 60. The front surface of the rear piece 54 has a circular Fresnel lens 62.

Ordinarily it will be desirable to apply "black" (light absorbing) stripes to the screen to improve contrast, for example, between the lenticules of the TIR array, as described in the above-referenced U.S. Pat. No. 4,573,764.

As used herein, the term "horizontal" refers to the direction in which maximum spreading of light is desired. Usually, this will be in the literal horizontal direction, but in special cases it could be in the literal vertical direction.

If a net angular elevation of light in the vertical direction for the peak luminance intensity is desired, it can be accomplished by several techniques: the imbedded linear lenticular arrays can have lenses which are appropriately asymmetric in cross-section, e.g., have tilted optical axis; the Fresnel center can be off-set vertically; the direction of the light illuminating the screen can be inclined.

I claim:

1. A rear projection screen comprising a vertically oriented, parallel array of lenticular elements on the front surface thereof, characterized in that the screen includes two diagonally crossed, parallel arrays of lenticular elements, at least one of which diagonally crossed arrays is imbedded in the screen.

2. The screen of claim 1 in which both diagonally crossed arrays are imbedded.

3. The screen of claim 1 in which the vertically oriented lenticular elements have steep sides for total internal reflection.

4. The screen of claim 1 in which the diagonally crossed lenticular elements form an angle beta with the vertical direction.

5. The screen of claim 4 in which beta is between 30 and 60 degrees.

6. The screen of claim 1 in which a circular Fresnel lens is present on the rear surface of the screen.

7. The screen of claim 1 in which light absorbing material is present between the lenticular elements on the front surface thereof.

8. The screen of claim 1 in which the screen consists of two pieces, a first piece and a second piece, the vertically oriented array is on the front of the first piece, and a circular Fresnel lens is present on the front of the second piece.

9. A projection video display apparatus including the screen of claim 1.

* * * * *